C. LEWIS & J. SOOTHILL.
Sewing-Machines.

No. 138,902.

Patented May 13, 1873.

Witnesses:
Chas. Nida
Sedgwick

Inventor:
C. Lewis
J. Soothill
Per
Attorneys.

UNITED STATES PATENT OFFICE.

CYRUS LEWIS AND JOSEPH SOOTHILL, OF HOWARD, ILLINOIS.

IMPROVEMENT IN SEWING-MACHINES.

Specification forming part of Letters Patent No. 138,902, dated May 13, 1873; application filed January 11, 1873.

*To all whom it may concern:*

Be it known that we, CYRUS LEWIS and JOSEPH SOOTHILL, of Howard, in the county McHenry and State of Illinois, have invented a new and useful Improvement in Sewing-Machines; and we do hereby declare that the following is a full, clear, and exact description of the same, reference being had to the accompanying drawing forming a part of this specification.

The invention consists in means for facilitating the application of glass to bearing-surfaces, as hereinafter described and pointed out in the claim.

Figure 1:
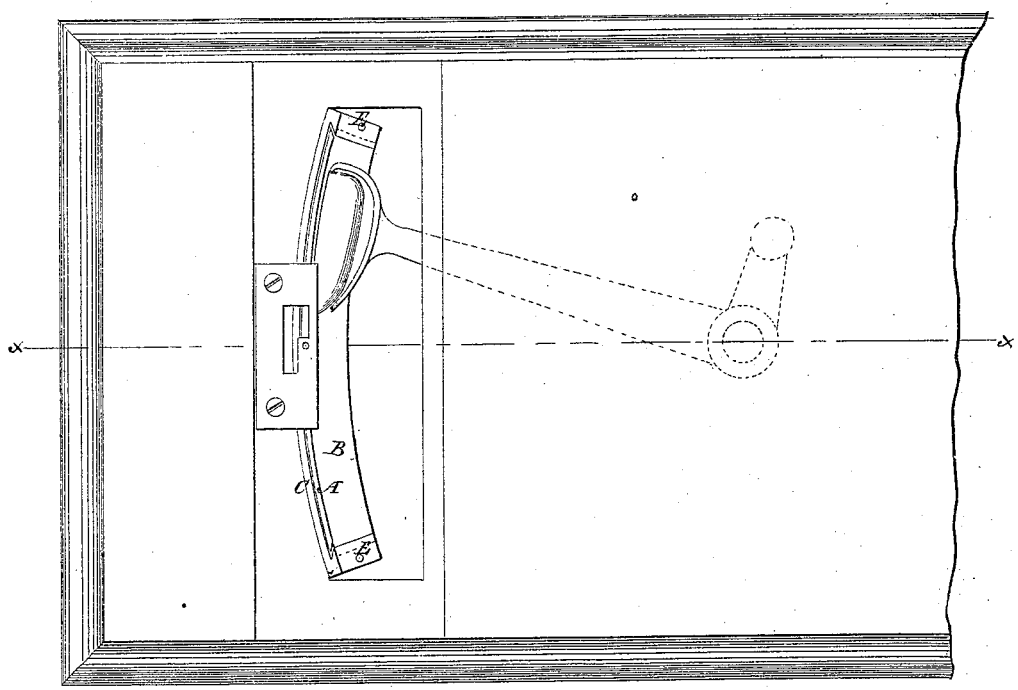
Figure 2:
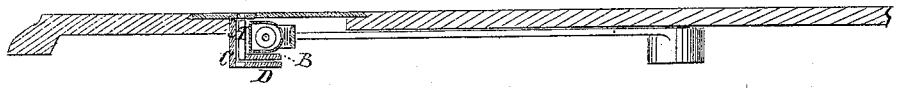

Figure 1 is a plan view of our invention. Fig. 2 is a longitudinal sectional elevation of Fig. 1 taken on the line $x\,x$.

A represents the vertical wall of the shuttle-race, and B the bottom, which are of glass. The glass race is supported by a metal plate, C D, to which it is fastened by clips E at the ends, the said clips being screwed on so as to be taken off. A groove or a slot is made in the part A for the needle. The glass race is bedded thereon, on its metal supports, in cement, shellac, or other elastic substance calculated to back it throughout, take up the shock, and prevent fracture.

Having thus described our invention, what we claim as new, and desire to secure by Letters Patent, is—

The combination, with a glass shuttle-race and its metallic support, of an elastic bed, as and for the purpose set forth.

CYRUS LEWIS.
JOSEPH SOOTHILL.

Witnesses:
F. B. CAREY,
WM. P. RATHBURN.